United States Patent [19]

White

[11] Patent Number: 5,419,476

[45] Date of Patent: May 30, 1995

[54] TRUCK TOOL BOX LOCKING DOOR PLATE

[76] Inventor: W. Wyatt White, 12970 Old Forge Rd., Waynesboro, Pa. 17268

[21] Appl. No.: 96,898

[22] Filed: Jul. 26, 1993

[51] Int. Cl.$^6$ .............................................. B60R 9/055
[52] U.S. Cl. ................................. 224/273; 224/42.42; 224/315; 296/37.6
[58] Field of Search ............... 224/273, 315, 327, 328, 224/42.42; 296/37.6

[56] References Cited

U.S. PATENT DOCUMENTS

| 4,451,075 | 5/1984 | Canfield | 224/42.42 R |
| 4,506,870 | 3/1985 | Penn | 224/42.42 R |
| 4,580,827 | 4/1986 | Feagan | 224/42.42 R |
| 5,088,636 | 2/1992 | Barajas | 224/315 |

Primary Examiner—Renee S. Luebke

[57] ABSTRACT

A truck bed mounting a tool box contained therewithin includes a container having first and second lids pivotally mounted relative to the top wall of the container, with the front wall of the container including a lock plate movably mounted relative to the front wall to effect compartmentalizing of storage below the tool box container relative to the truck bed.

5 Claims, 4 Drawing Sheets

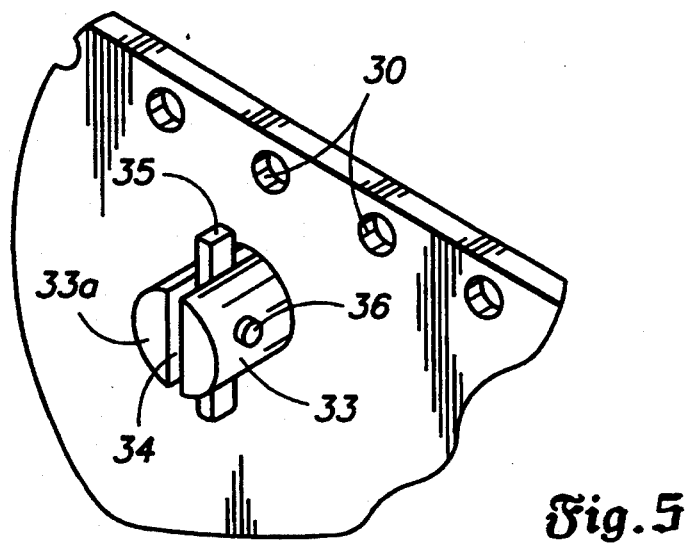
Fig. 5
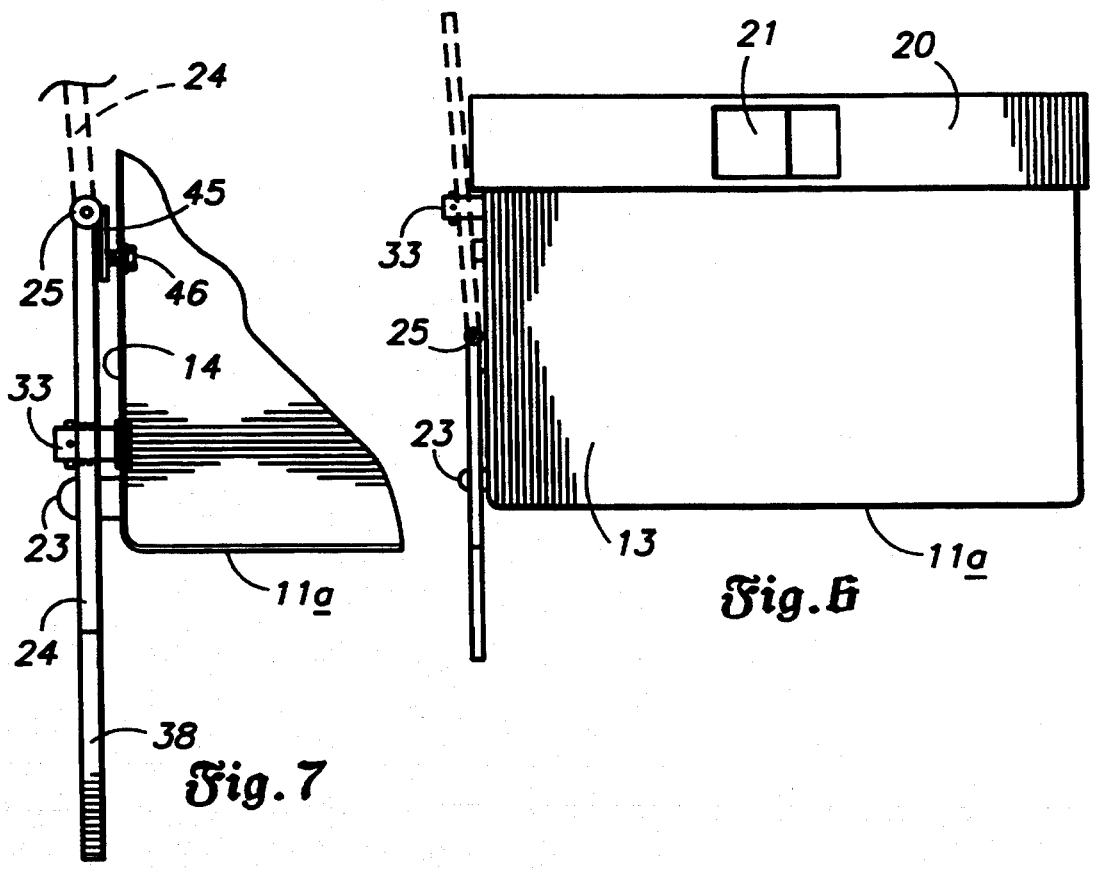
Fig. 7
Fig. 6

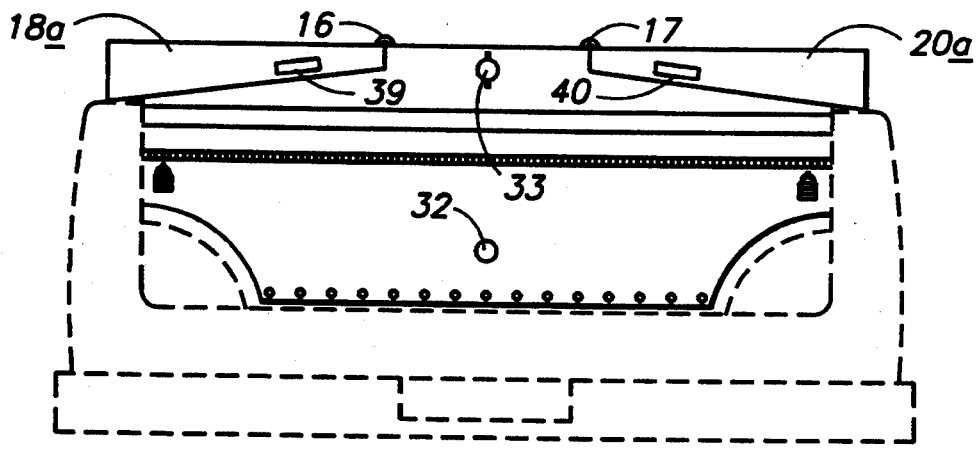
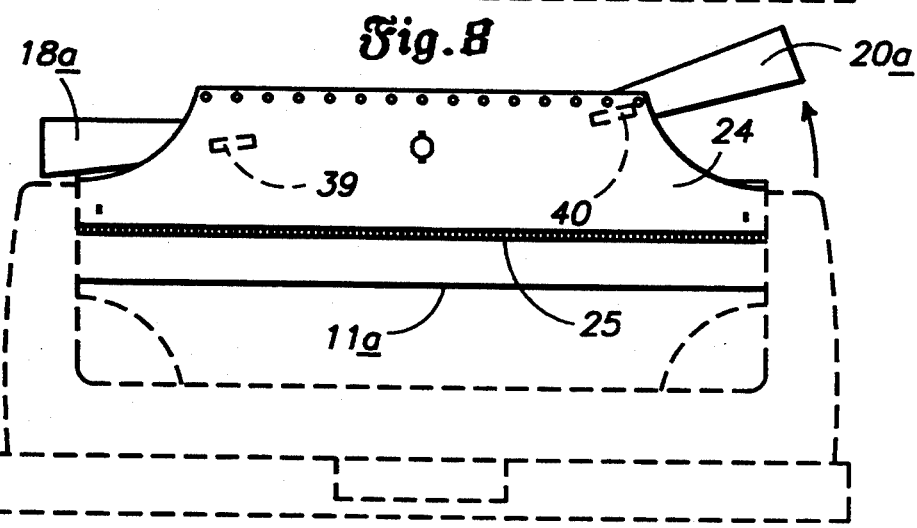
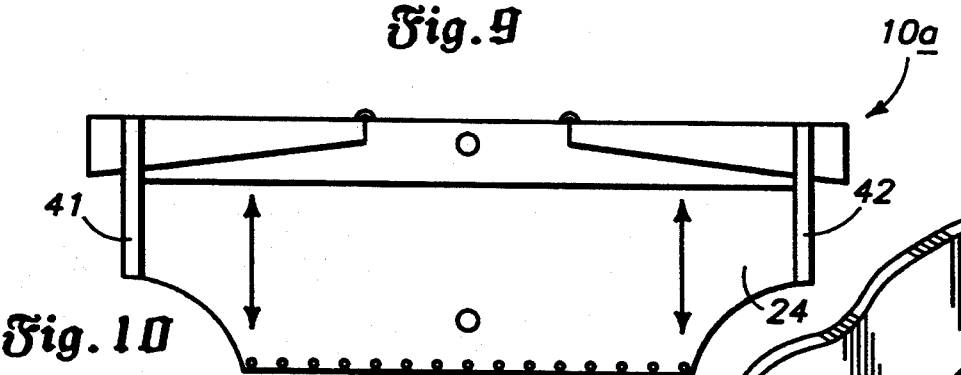
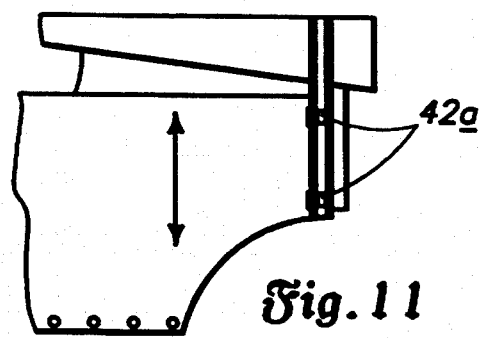
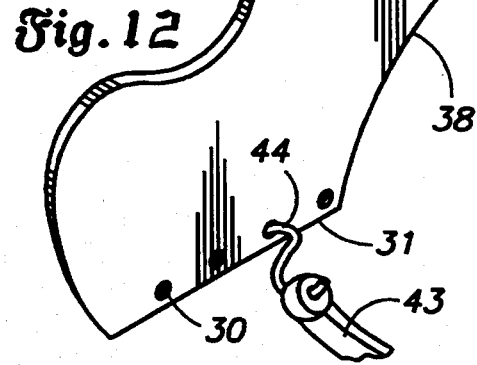

TRUCK TOOL BOX LOCKING DOOR PLATE

BACKGROUND OF THE INVENTION

1. Field of the Invention

The field of invention relates to truck tool box structure, and more particularly pertains to a new and improved truck tool box locking door plate wherein the same is directed to the selective segregation of storage beneath an associated truck tool box relative to the truck bed.

2. Description of the Prior Art

Conventional truck tool boxes include an area below the tool box, wherein such storage area is subject to debris accumulation and the like, wherein the instant invention attempts to overcome deficiencies of the prior art by providing for a battery or door plate movably mounted relative to the tool box container to provide for additional storage below the tool box, as well as maintaining the area below the tool box in a relatively secure manner relative to debris and the like and in this respect, the present invention substantially fulfills this need.

SUMMARY OF THE INVENTION

In view of the foregoing disadvantages inherent in the known types of truck tool box structure now present in the prior art, the present invention provides a truck tool box locking door plate wherein the same is directed for the mounting in a movable manner of a locking door plate relative to the floor portion of a tool box to effect compartmentalizing of storage below the tool box relative to a remaining portion of an associated truck bed. As such, the general purpose of the present invention, which will be described subsequently in greater detail, is to provide a new and improved truck tool box locking door plate which has all the advantages of the prior art truck tool box apparatus and none of the disadvantages.

To attain this, the present invention provides a truck bed mounting a tool box container therewithin, including a container having first and second lids pivotally mounted relative to the top wall of the container, with the front wall of the container including a lock plate movably mounted relative to the front wall to effect compartmentalizing of storage below the tool box container relative to the truck bed.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved truck tool box locking door plate which has all the advantages of the prior art truck tool box apparatus and none of the disadvantages.

It is another object of the present invention to provide a new and improved truck tool box locking door plate which may be easily and efficiently manufactured and marketed.

It is a further object of the present invention to provide a new and improved truck tool box locking door plate which is of a durable and reliable construction.

An even further object of the present invention is to provide a new and improved truck tool box locking door plate which is susceptible of a low cost of manufacture with regard to both materials and labor, and which accordingly is then susceptible of low prices of sale to the consuming public, thereby making such truck tool box locking door plates economically available to the buying public.

Still yet another object of the present invention is to provide a new and improved truck tool box locking door plate which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an enlarged isometric illustration of section 5 as set forth in FIG. 2.

FIG. 6 is an orthographic side view of the tool box structure indicating the pivotal mounting of the door plate.

FIG. 7 is an enlarged isometric illustration of the invention including the hinge structure removably mounted relative to the front wall of the tool box container.

FIG. 8 is an orthographic rear view of the invention, including magnetic supports relative to the door plate.

FIG. 9 is an orthographic rear view of the invention indicating the magnetic door plates magnetically adhered to the door plate when the door plate is in a raised orientation.

FIG. 10 is an isometric illustration of a modified aspect of the invention indicating a sliding door plate structure.

FIG. 11 indicates the track structure including roller members arranged for ease of sliding of the door plate relative to the track structure.

FIG. 12 is an isometric illustration of the door plate for use in securement of tie straps relative thereto for securing cargo within the truck bed.

DESCRIPTION OF THE PREFERRED EMBODIMENT

Figure 1:
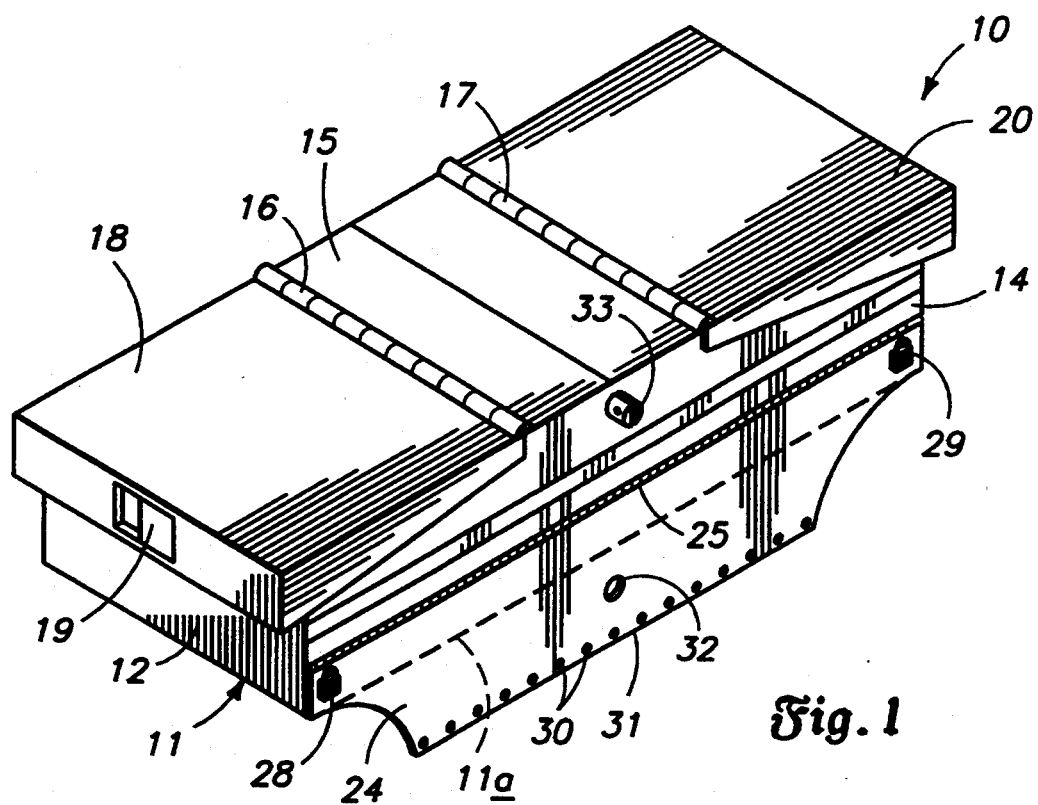
FIG. 1 is an isometric illustration of the invention.

With reference now to the drawings, and in particular to FIGS. 1 to 12 thereof, a new and improved truck tool box locking door plate embodying the principles and concepts of the present invention and generally designated by the reference numerals 10 and 10a will be described.

Figure 2:
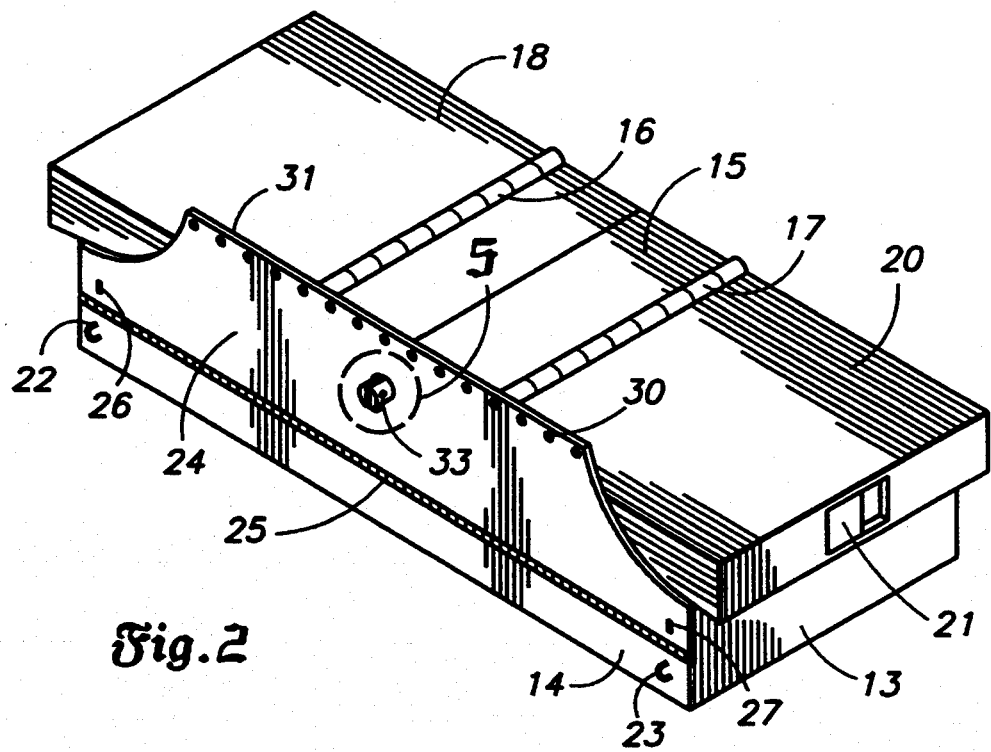
FIG. 2 is a further isometric illustration of the invention indicating the door plate in a lifted manner relative to the tool box front wall.
Figure 3:
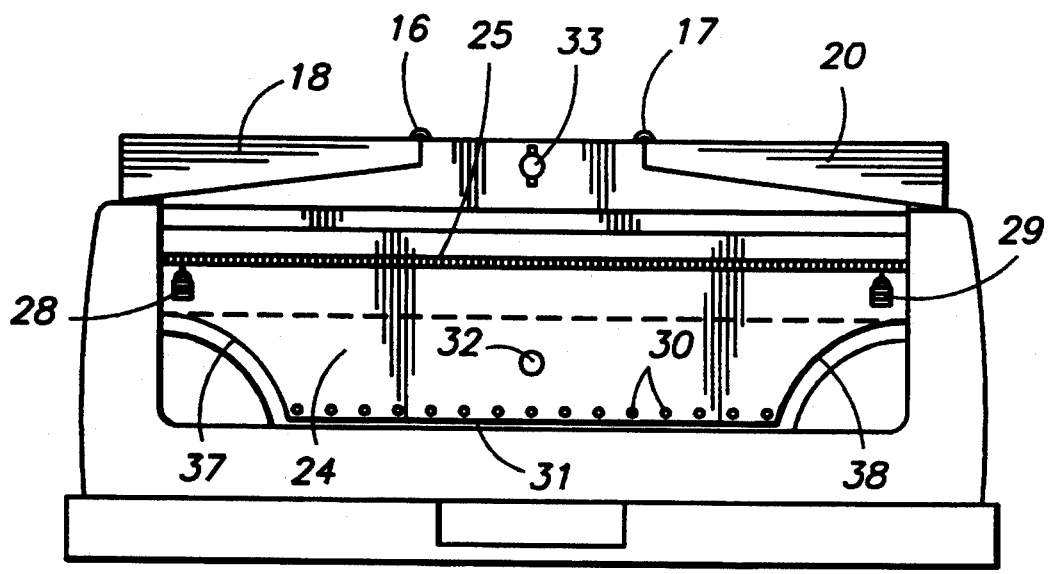
FIG. 3 is an orthographic view of the invention mounted within a truck bed.
Figure 4:
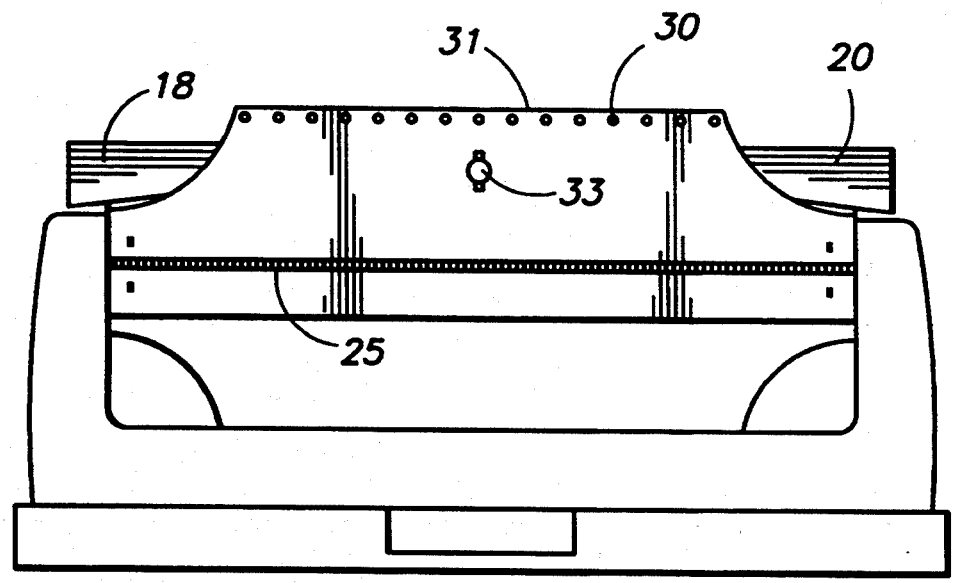
FIG. 4 is an orthographic view of the tool box mounted within a truck bed with the door plate in a raised orientation latched relative to the front wall of the tool box container.

More specifically, the truck tool box locking door plate 10 of the instant invention essentially comprises a tool box container 11, having a first side wall 12 spaced from a second side wall 13, with a container floor 11a spaced from the container top wall 15. The container including a container front wall 14. The top wall 15 includes spaced, parallel first and second hinges 16 and 17 respectively and pivotally mounting first and second door lids 18 and 20, having respective first and second latches 19 and 21 for securement of the lids relative to the respective first and second side walls 12 and 13. First and second locking loops 22 and 23 respectively are fixedly mounted to the front wall 14 adjacent the respective first and second side walls 12 and 13. The first and second locking loops 22 and 23 are received respectively through first and second slots 26 and 27 directed through a lock plate 24 hingedly mounted to the front wall 14 about a lock plate hinge 25 that extends between the first and second side walls 12 and 13. First and second lock members 28 and 29 are thereby received through the first and second locking loops 22 and 23, wherein the first and second locking loops are in turn received through the first and second slots 26 and 27 when the lock plate 24 is in the first lowered position, as indicated in FIG. 1. A row of apertures 30 is directed through the lock plate 24 in adjacency to the lock plate lower edge 31 that is spaced from and parallel to the hinge 25. The aperture 30 is for receiving a cord hook portion 44 of a typical securement cord 43, as indicated in FIG. 12 to assist in securement of cargo within the truck bed that in turn is of conventional construction, of a type as indicated in FIG. 3, having associated left and right wheel wells that in turn are received complementarily within first and second recesses 37 and 38 directed into the lock plate. The recesses extend from the lock plate side walls to the lock plate lower edge 31. An opening 32 is directed through the lock plate spaced a predetermined spacing from the hinge 25. A locking boss 33 is fixedly mounted to the front wall 14 spaced the predetermined spacing from the hinge 25 in alignment with the opening 32 to be received through the opening 32 when the lock plate is in the second raised position, in a manner as indicated in FIG. 2. The locking boss 33 includes a locking boss slot 34 diametrically directed through the locking boss, having a lock lever 35 pivotally mounted within the locking boss slot 34 about an axle 36. In this manner, the lock lever 35 is pivoted within the slot 34 to project the lock lever 35 through the locking boss top wall 33a permitting reception of the locking boss through the opening 32, wherein the lock lever 35 is subsequently pivoted when the locking plate is in the second position, as indicated in FIG. 5, pivoted for projection of the locking lever 35 through the locking boss side wall to in this manner maintain the locking plate in the raised orientation.

FIG. 7 indicates that the hinge 25 mounted to a hinge plate 45 is adjustably mounted relative to the front wall 14 by threaded fastener 46 to permit adjusting of tensioning of the lock lever and the lock members when directed through the associated locking loops 22 and 23.

The FIGS. 8 and 9 indicate the further use of first and second magnets 39 and 40 mounted to the respective first and second modified lids 18a and 19a respectively for magnetic adherence of the locking plate permitting individuals to temporarily position the locking plate in a raised orientation not requiring the manipulation of the locking boss 33 and its associated locking lever.

Further, as indicated in FIGS. 9–11, first and second slide tracks 41 and 42 are mounted to the front wall 14 at the opposed first and second side walls, in a manner as indicated by the apparatus 10a, to permit sliding manipulation of the locking plate relative to the front wall 14 where additionally rollers 42a mounted within the respective slide tracks 41 and 42 are provided for ease of manipulation of the slide tracks relative to the lock plate 24 in use.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A truck tool box, comprising,
   a tool box container, said container having a first side wall spaced from a second side wall, a front wall extending between the first side wall and the second side wall, and a top wall extending between the first side wall and the second side wall, with the top wall including a first hinge spaced from a second hinge, and a first lid mounted to the second hinge, and a lock plate, the lock plate including a lock plate hinge hingedly mounting the lock plate to the front wall, the lock plate includes at least one locking plate slot, and the front wall includes at least one first locking loop, wherein the at least one first locking loop is slidably received through the locking plate slot when the locking plate slot is in a first lowered position, and the tool box container having a container floor, with the lock plate extending below the container floor in a first position, with the plate arranged for pivoting about the hinge to a second position, with the lock plate extending beyond the top wall in the second position.

2. A lock plate as set forth in claim 1 wherein the lock plate includes an opening directed therethrough spaced a predetermined spacing from the lock plate hinge, and the front wall having a locking boss spaced from the lock plate hinge said predetermined spacing for reception through the opening in the second position.

3. A lock plate as set forth in claim 2 wherein the locking boss includes a locking boss slot, with a lock lever pivotally mounted within the locking boss slot, and an axle directed through the locking boss, and the locking boss slot pivotally mounting the lock lever about the axle.

4. A lock plate as set forth in claim 3 wherein the lock plate includes a lock plate lowermost edge spaced from and parallel to the lock plate hinge, and the lock plate lowermost edge including a row of apertures directed through the lock plate in adjacency to the lock plate lowermost edge, and at least one locking cord having a cord hook arranged for reception through one of said apertures for securement of cargo within a truck bed mounting said tool box container.

5. A lock plate as set forth in claim 4 with the first lid having a first magnet, the second lid having a second magnet, with the first magnet and the second magnet arranged for magnetic adherence of the lock plate when the lock plate is in the second position.

* * * * *